July 30, 1963 E. L. LUSTENADER ET AL 3,099,607
VAPOR RECIRCULATION DISTILLATION PROCESS AND APPARATUS
Filed July 20, 1960 3 Sheets-Sheet 1
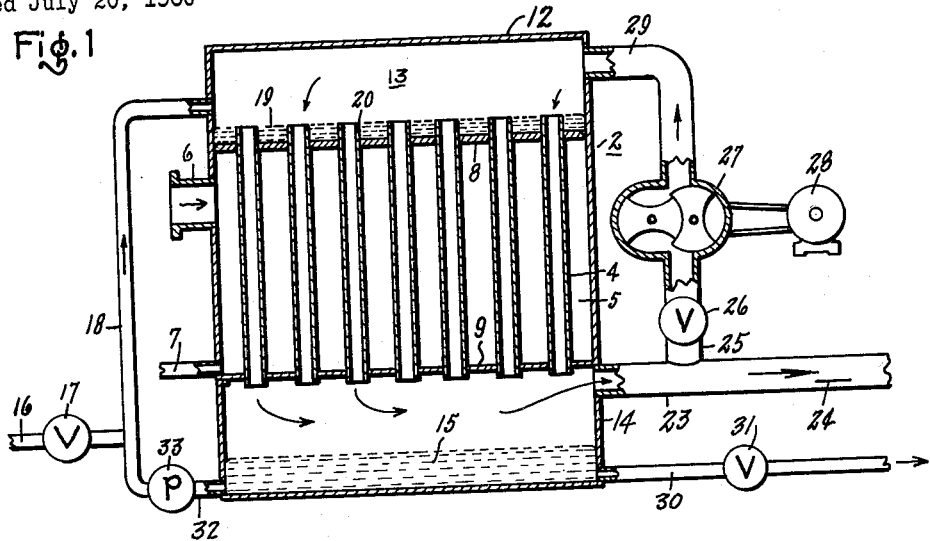
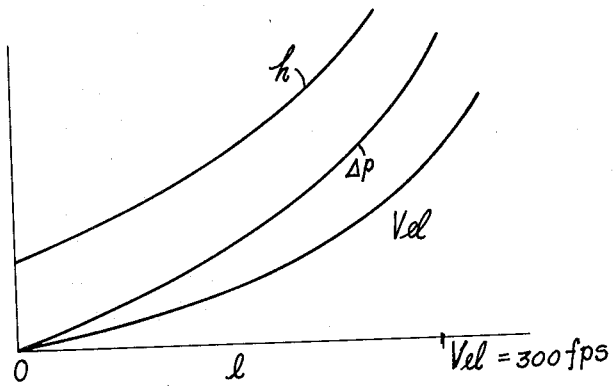
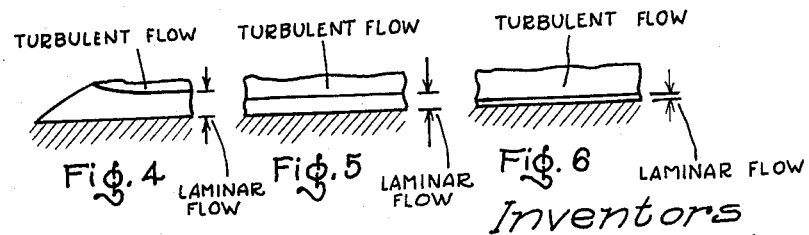
Inventors
Edward L. Lustenader
Dale H. Brown
by Paul A. Frank
Their Attorney Inventors
Edward L. Lustenader
Dale H. Brown
by Paul A. Frank
Their Attorney Inventors
Edward L. Lustenader
Dale H. Brown
by Paul A. Frank
Their Attorney

United States Patent Office 3,099,607
Patented July 30, 1963

3,099,607
VAPOR RECIRCULATION DISTILLATION
PROCESS AND APPARATUS
Edward L. Lustenader and Dale H. Brown, Scotia, N.Y.,
assignors to General Electric Company, a corporation
of New York
Filed July 20, 1960, Ser. No. 44,146
6 Claims. (Cl. 202—64)

This invention relates to a method and apparatus for heat exchange, and more particularly, to a method and apparatus for distillation including an evaporation process utilizing a turbulent film.

At the present time, the commercial feasibility of apparatus and processes wherein heat exchange members are utilized is to a large extent dependent upon the effectiveness and the initial cost of the heat exchange construction. This is especially evident in distillation apparatus wherein saline water is converted into potable water for domestic and industrial use. Under such circumstances, the success of the apparatus is dependent mostly on economic factors and more specifically on maintaining the cost of the water less than a predetermined amount. Usually, the heat exchange process in distillation apparatus includes the step of transferring heat from one medium to a second medium, for example, from steam to a distilland which may be saline water, the steam being condensed and the saline water being evaporated to supply potable water. In the heat exchange process usually the steam is condensed on the heat exchanger member. The heat from the vapor condensed is transmitted by conduction through the liquid film formed by the condensed vapor, and is transmitted through a heat exchange member by conduction to a liquid distilland present on the opposite side of the heat exchange member. Usually, the heat passes through the liquid by conduction and evaporates a portion of the liquid. It has been found that these three conduction processes, two through liquids and one through a solid, form a substantial thermal resistance which may reduce over-all heat transfer.

More effective heat exchange processes permit the use of less heat exchange surface and a smaller energy input. Attempts have been made to minimize the heat transmission resistance at the condensing surface by removing the condensing film through the utilization of dropwise condensation or to have controlled filmwise condensation, for example, of the type disclosed in the copending application of R. Ritcher, Serial No. 806,185, filed April 13, 1959, entitled, "Heat Exchange Apparatus and Condensing Surface," now abandoned, which is assigned to the assignee of the present application. Heat transmission through heat exchanger members has been improved by the use of materials having high conductivity, such as copper and copper alloys. At the evaporating surface, heat transfer may be improved through the evaporation of thin films.

The present invention discloses arrangements for improving the over-all heat transfer coefficient from the condensing vapor to the evaporating vapor from an average value of 300 B.t.u./hr. sq. ft. ° F. (British thermal units per hour, square feet, degree Fahrenheit) to a value in excess of approximately 4,000 B.t.u./hr. sq. ft. ° F. This may be achieved by employing a condensation process such as dropwise condensation or filmwise condensation according to the teaching of Richter application and an evaporation process utilizing a turbulent film having an extremely small sublayer of fluid in laminar flow.

The chief object of the present invention is to provide an improved method and apparatus for heat exchange employing an evaporation process utilizing a turbulent film of liquid.

Another object of the invention is to provide an improved method and apparatus for heat exchange wherein the liquid being evaporated is applied to the evaporating surface and caused to flow thereon in a turbulent film maintained by the flow of vapor over the film at high velocities.

A still further object of the apparatus is to provide an improved method and apparatus for distillation wherein disilland is applied to an evaporating surface in the form of a film subjected to controlled turbulent flow, as a result of the flow of vapor adjacent the distilland, a portion of the disilland vapor being recirculated to maintain the turbulent film on the evaporating surface.

These and other objects of our invention will be more apparent from the following description.

Briefly stated, the present invention relates to a method and apparatus for distillation wherein distilland is applied and flowed over a stationary heat exchange surface placing the distilland in heat exchange relation with medium on the opposite side of the heat exchange surface, vapor being passed adjacent the distilland in a manner to create turbulent flow in the distilland whereby a sublayer of distilland having laminar flow with a thickness less than approximately one thousandths of an inch is formed between the heat exchange surface and the distilland in turbulent flow to evaporate a substantial portion of the distilland, a portion of the vapor evolved being recirculated over the distilland to maintain the turbulent flow therein. The term "distilland" as used herein denotes any liquid which is evaporated.

The attached drawings illustrate preferred embodiments of the invention in which:

FIGURE 1 is a diagrammatic view of a modified falling film type evaporator for practicing the present invention;

FIGURE 3 is a diagram plotting length of tube vs. the local conditions of velocity, pressure drop, and heat transfer coefficient with diagrammatic views in FIGURES 4, 5, and 6 showing the condition of the film at corresponding points on the heat exchange surface;

Figure 8:
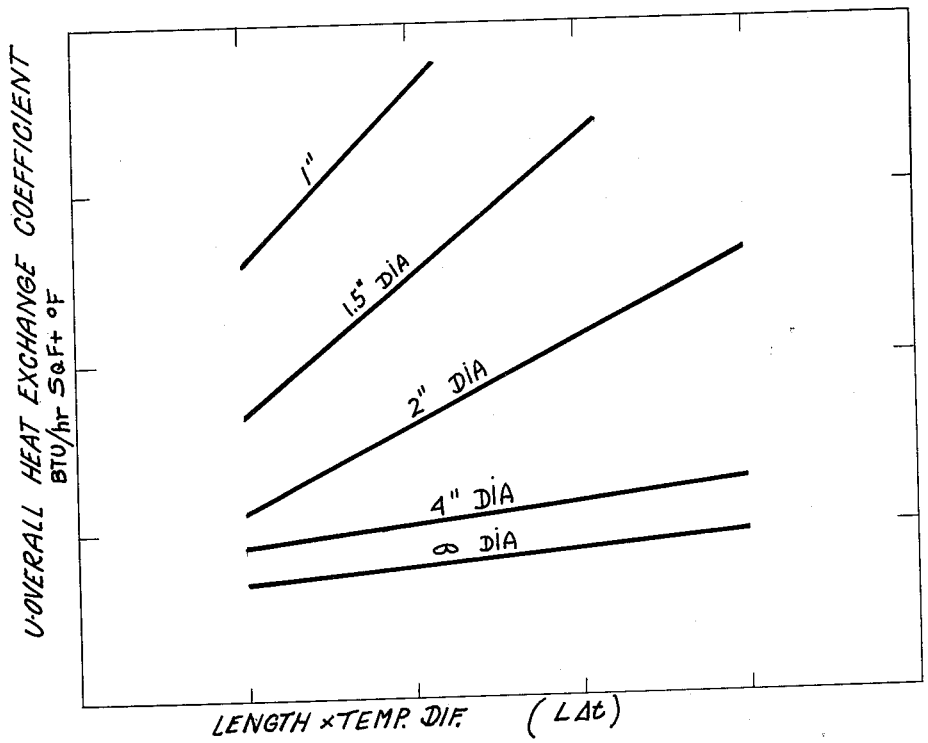
FIGURE 8 is a diagram plotting the product of tube length and temperature difference vs. heat transfer coefficient for various diameter tubes.

While the practice of the invention is not restricted to the type of apparatus shown herein, evaporators of the type known as falling film evaporators, lend themselves especially to the practice of the present invention. In FIGURE 1, there is shown an apparatus comprising a shell 2 which envelops a plurality of tubes 4 which together with an upper barrier 8, and a lower barrier 9, defines a jacket 5, about tubes 4, into which a heat exchange medium such as steam may be introduced to evaporate liquid placed within tubes 4. The heat exchange medium may be introduced into jacket 5 through nozzle opening 6. The steam vapor condenses on the outside surfaces of tubes 4 to form condensate in the lower portion of steam jacket 5, the condensate being discharged therefrom through line 7.

The liquid to be evaporated, which may be a saline solution such as sea water, may be introduced into the system through line 16, and valve 17 to supply line 18 which discharges the liquid into the upper chamber 13, said chamber being substantially defined by end member 12 and barrier 8. The upper ends of tubes 4 which protrude and extend above barrier 8 may include weir means 20 which distribute the liquid along the inner periphery of tubes 4 in a manner to define an annular thin film preferably having a thickness of approximately one quarter of an inch. This film is placed in heat exchange relation with the condensing vapor in steam jacket 5 in a manner described more fully hereinafter.

The distilland, which may be saline water, flows downwardly over the inner surfaces of the tubes and a portion thereof evaporates to form distillate vapor which passes downwardly into sump 15 which is substantially defined by end member 14. The remaining distilland which is in a concentrated form, flows into sump 15 from whence it may be recirculated through line 32, pump 33, to supply line 18 which reintroduces a portion of the distilland into upper chamber 13. Makeup distilland is introduced through the previously mentioned line 16. In order to maintain a desired concentration in the distilland in sump 15, a portion of the solution is removed through line 30, the amount removed being controlled by valve 31.

The vapor being discharged from tubes 4 is passed through line 23 and then through line 24 and line 25. Line 24 may be connected to a suitable condensing unit wherein the vapor is condensed to form potable water. If desired, the entire vapor evolved from the distilland may be compressed in a manner wherein a substantial portion of the vapor is introduced into nozzle 6 to form the heat exchange medium for evaporating the vapor in the tubes, such compression distillation apparatus being well known in the art. The vapor passing through line 25 constitutes a portion of the vapor recirculated in the apparatus and the amount passing through line 25 may be controlled by valve 26 or by speed variation of compressor 27. The vapor is suitably compressed in compressor 27 which may be a Roots blower type apparatus driven by motor 28, the compressed vapor being discharged through line 29 into upper chamber 13.

Considering the operation of the present invention, steam or other heat exchange medium is introduced into nozzle 6 and the vapor is condensed on the outside surfaces of tubes 4. The outside surfaces of tubes 4 preferably are of a type whereon either dropwise condensation occurs or a controlled filmwise condensation of the type described in the previously mentioned Richter patent application. In the case of the dropwise condensation, the outer surfaces of tubes 4 may be smooth having the surface treated with a suitable chemical promoter or utilizing a construction of the type described in the copending application of F. J. Neugebauer and E. L. Lustenader, Serial No. 20,600, filed April 7, 1960, entitled "Method and Apparatus for Distillation," which is assigned to the assignee of the present application. The vapor is condensed in the steam jacket in a manner so that the coefficient of heat transfer from the vapor to the surface is extremely high. The condensed vapor may be discharged from jacket 5 through line 7.

Distilland may be introduced into the upper chamber 13 and because of weir construction 20 associated with each tube 4, a film of distilland, approximately one-quarter of an inch thick is formed on the inside surfaces of the tubes. As the liquid passes down each tube, a portion thereof is evaporated forming a vapor stream passing in the same direction (downwardly) as the distilland. As more and more vapor is generated, the velocity of the vapor increases so that distilland, which initially was flowing in substantially laminar or streamline flow, because of a frictional drag or vapor shear effect of the flowing vapor causes turbulence to occur in the adjacent portions of the distilland film. As the velocity of the vapor increases, the turbulence extends more deeply into the distilland film until only a laminar sublayer having streamline flow less than approximately one thousandth of an inch exists adjacent the tube surface. The vapor is ultimately discharged from tube 4 and either discharged through line 24 or a portion recirculated through line 25, pump 27, line 29 into upper chamber 13. The recirculated vapor introduced in upper chamber 13 maintains a high velocity vapor stream passing through the entire length of each tube 4 so that desired turbulence exists in the entire tube length thereby assuring high heat transfer. Recirculation of vapor through the tubes maintains a desired amount of turbulence in the liquid substantially the entire length of the tube. Recirculation of vapor furthermore permits improved control of the thickness of the laminar sublayer in streamline flow. By maintaining turbulent flow in the film throughout the entire length of tube and also by controlling the thickness of the laminar sublayer, the over-all heat transfer coefficient may be maintained relatively high.

For the forementioned reasons, recirculation of vapor is preferred, however, the present invention may be practiced without vapor recirculation. In the event recirculation of vapor is not utilized, operating conditions and the geometry of the tubes must be maintained in a manner wherein the rate of vapor generation is such that the velocity of the vapor creates sufficient turbulence to define the desired thickness of liquid in laminar flow. Without recirculating vapor, the upper portions of each tube may have substantial portions in laminar flow and thereby realize local heat transfer coefficients lower than those experienced in the lower portions of each tube to harmfully affect the over-all heat transfer coefficient for the tube.

Figure 2:
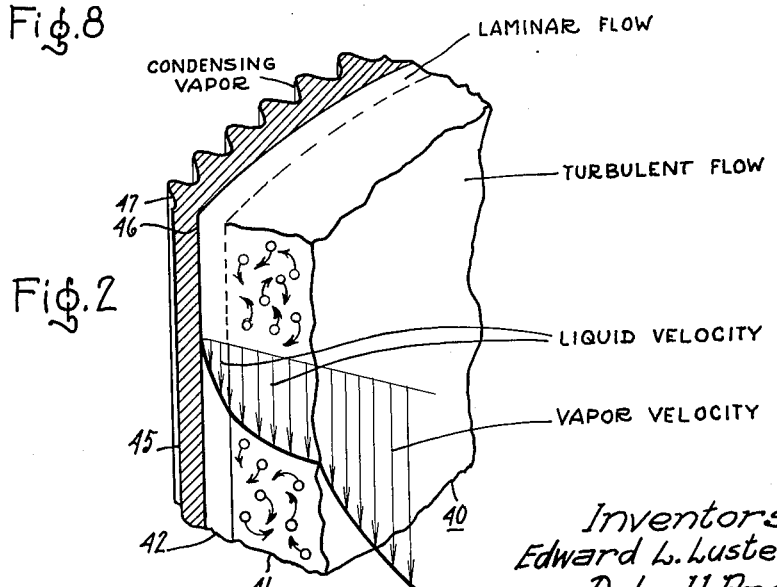
FIGURE 2 is a fragmentary perspective view of a section of heat exchange surface illustrating the condition of the film being evaporated thereon.

FIGURE 2 illustrates an enlarged sectional view of a sector of tube 4. Tube wall 45 comprises an outer surface 47 having parallel undulations with outwardly projecting condensation areas and narrow inwardly projecting drainage areas constructed in accordance with the teaching of the previously mentioned Richter application upon which vapor condenses and because of the contoured or fluted nature of the surface and the surface tension of the condensed vapor substantially all drainage of condensate occurs in the fluted channels defined by the drainage areas thereby permitting a high heat transfer coefficient between the vapor and the condensing surface. Distilland film 40 passing down the inner surface 46 of the tube is shown to have a turbulent portion 41 which is a substantial portion of the film and a sublayer 42 in laminar flow. The flow of the vapor and the distilland film is in the same direction in this embodiment.

It has been found that heat transfer through a turbulent film presents substantially no resistance to heat transfer. This may be explained as being due to the turbulent nature of the film wherein there occurs continuous erratic movement of portions of the liquid in eddies. Heat is transferred through such a turbulent film by the erratic movement of these portions which comprise particles or packets which transfer the heat freely across the film in turbulence. The portion of the film adjacent the wall resists such turbulence to varying degrees forming a sublayer in streamline flow and heat transfer through such a sublayer in streamline or laminar flow is performed by conduction. Heat transfer by conduction under such circumstances provides substantial thermal resistance. By controlling the degree of turbulence so that the sublayer in laminar flow is maintained small, this thermal resistance is low and heat transfer through the entire film is performed with a high heat transfer coefficient.

FIGURE 2 also illustrates the comparative velocities of portions of the fluids flowing down the heat exchange surface. Adjacent surface 46 the velocity of the distilland is zero and increases rapidly to the point where turbulent flow begins. The velocity of the distilland from the boundary area between turbulent flow and laminar flow increases continuously, but more slowly toward the film surface.

In FIGURE 3, there is shown a diagram plotting length of tube 1 vs. heat transfer coefficient $h$, pressure drop $\Delta p$, and velocity $v$ for an evaporating surface, assuming constant temperature differences and constant diameter tubes. Below this diagram are shown three views (FIGURES 4, 5, and 6) illustrating the nature of the film at points on the tube.

Assuming that no vapor recirculating means are utilized in the apparatus at zero length of tube, flow is at zero velocity with zero pressure drop and with a known heat transfer coefficient due to pure conduction through the film. As turbulence occurs in the film due to vapor flow adjacent thereto, strata of laminar and turbulent flow are formed (FIGURE 4). The pressure drop in the vapor passing through the tube increases as the velocity increases, and this is accompanied by a suitable increase in heat transfer coefficient since heat transfer by means of conduction occurs only through the laminar sublayer which becomes a small portion of the total film thickness (FIGURE 5). At a maximum velocity (FIGURE 6), for example, the velocity being in the range of 300 ft. per second, the pressure drop becomes increasingly large. However, this is accompanied by a high heat transfer coefficient on the evaporating surface since the laminar flow layer in the film is extremely small. In actual practice a velocity of 150 ft. per second is apparently desirable since at this velocity, pressure drop is tolerable from the standpoint of equipment cost and energy required to move the vapor.

Figure 7:
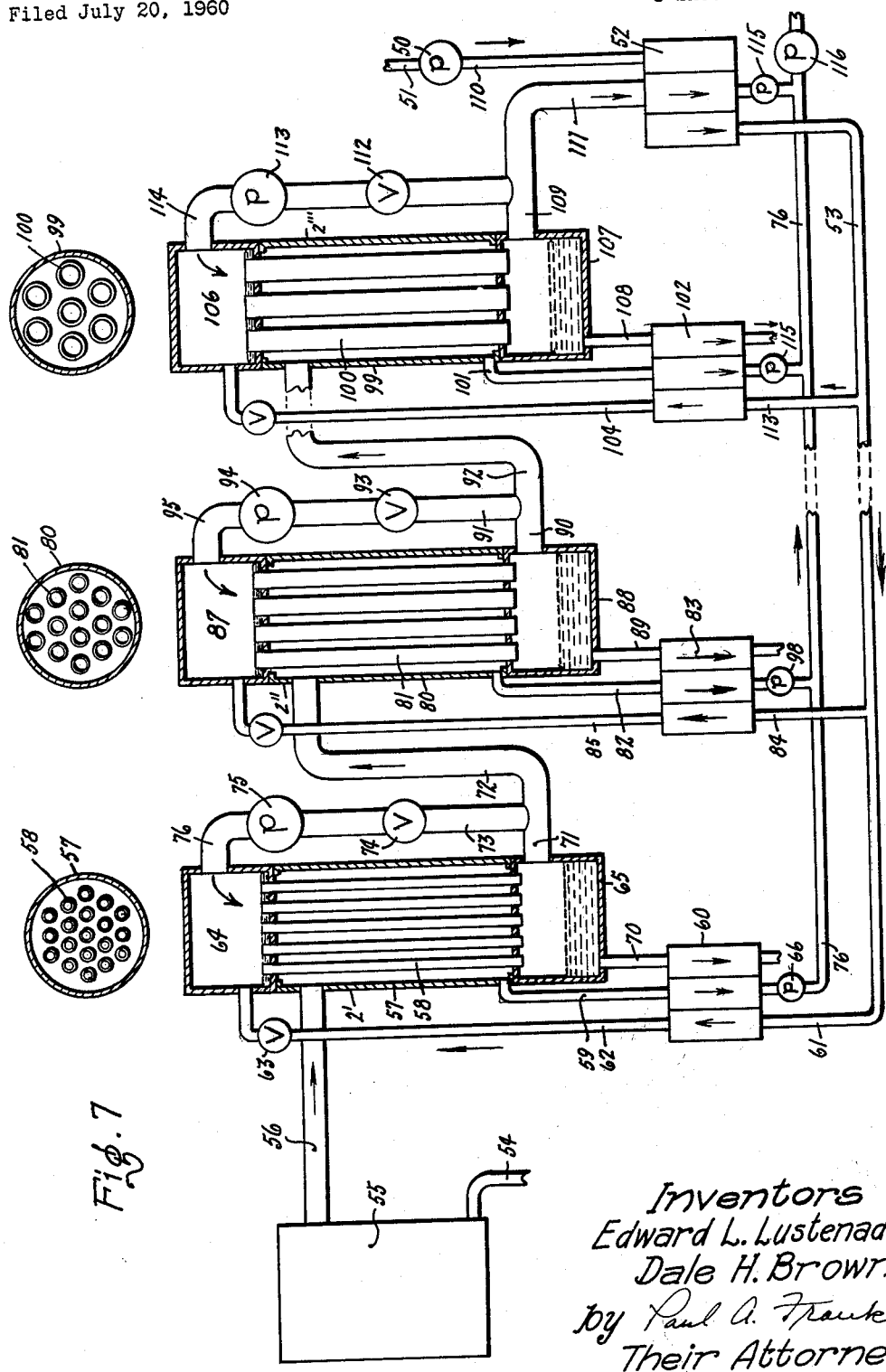
FIGURE 7 is a diagrammatic view of another embodiment of the invention employing a multiple stage effect.

In FIGURE 7 there is shown an apparatus employing a multiple stage effect for practicing the present invention. Distilland, which may be saline water, is supplied through line 51 to pump 50 which passes the liquid to heat exchanger 52. In heat exchanger 52 vapor from line 111 is condensed thereby heating the distilland which is discharged through line 53 into a plurality of falling film evaporators in a manner more fully described hereinafter. Boiler feed water may be supplied through line 54 to a suitable heat source 55, which may be a boiler or atomic reactor. Vapor from the heat source is passed through line 56 into steam jacket 57 of first evaporator 2'. The steam condenses on the outer surfaces of tubes 58 and the condensate is discharged through line 59 into heat exchanger 60 wherein the heat of the condensate is transferred to distilland being introduced through line 61 for supply to first stage 2'. This condensed vapor which is discharged from heat exchanger 60 constitutes potable water which is passed by pump 66 through line 76 and from the system for use.

The heated distilland from heat exchanger 60 is passed through line 62 and the flow thereof is controlled by a valve 63 to maintain a suitable level above the tubes in upper chamber 64 of evaporator 2'. The level of distilland in the upper chamber may be utilized to regulate the thickness of film inside the tubes 58. The film is evaporated in the manner described with respect to FIGURES 1, 2, and 3, the concentrated distilland being collected in sump 65 from which it is discharged through line 70 into heat exchanger 60 and from the system.

The vapor formed in tubes 58 is passed through line 71 and a substantial portion may be supplied to a second evaporator 2'' through line 72. However, a predetermined portion of this vapor, as determined by valve 74, may be passed through line 73 to a suitable compressor 75, through line 76 and into upper chamber 64. The recirculated vapor is intended to maintain a high vapor velocity in tubes 58 so that the desired amount of turbulence is achieved in the film to permit heat exchange from the surface to the vapor with a high heat transfer coefficient. In FIGURE 7 above evaporator 2', there is shown a section of the steam jacket 57 illustrating the size of tubes 58. It will be noted that these tubes are small and many in number.

Vapor from the first evaporator is introduced into jacket 80 of second evaporator 2'' and is condensed on tubes 81 and discharged through line 82 into heat exchanger 83. This condensate is potable water which is pumped by pump 98 through line 76. Distilland is introduced into this stage through line 84 through heat exchanger 83, line 85, valve 86 into upper chamber 87, the vapor passing through tube 81 in a manner as previously described, evaporating a substantial portion of the distilland. Concentrated distilland is collected in sump 88 and discharged through line 89, heat exchanger 83, and from the system. Vapor is discharged from the lower portion of the second evaporator through line 90, line 92, and to the next stage. A portion of the vapor is recirculated through line 91, valve 93, compressor 94, line 95 into upper chamber 87 in a manner similar to that practiced in evaporator 2'. Above evaporator 2'' is shown a cross-section of the steam jacket 80 with tubes 81. It will be noted that these tubes are larger in diameter than the tubes utilized in evaporator 2'.

This heat exchange process may be performed in a desired number of stages, each stage operating at conditions of lower pressure and temperature. In last stage 2''', vapor is introduced into steam jacket 99 condensing the vapor on tubes 100. The condensate being discharged through line 101, heat exchange 102, pump 115, and line 76.

Distilland is introduced into this last stage through line 103, heat exchanger 102, line 104, valve 105 into upper chamber 106. The distilland passes down through tubes 100 and a portion of the distilland is evaporated. Concentrated distilland is collected in sump 107 and is discharged through line 108, heat exchanger 102 and from the system. Vapor is discharged from this stage through line 109, line 111, into heat exchanger 52 wherein the vapor is condensed and discharged through lines 115 and 76. This condensed vapor which is potable water is collected with the condensed vapor from the previous stages and passed by means of pump 116 from the system for use. A portion of the vapor from the last stage 2''' may be recirculated through line 110, valve 112, pump 113, line 114, into upper chamber 106.

A cross section of jacket 99 indicates that this last stage utilizes the smallest number of tubes having greater diameter than the previously utilized tubes in the other evaporators. The reason for this increasing cross section and fewer heat exchange tubes as the number of stages progresses is that the specific volume of the vapor is continually increasing and in order to pass the vapor through the later stages at essentially the same velocity, a greater cross-sectional area in the tubes is required. For example, if the first stage of this apparatus utilizes steam at 20 p.s.i.a. (pounds/sq. in. absolute) pressure, the last stage may utilize vapor at a pressure of 5 p.s.i.a. (vacuum). The specific volume of the vapor in the first stage may be approximately 50 cu. ft./lb. while in the last stage, the specific volume of vapor may be 120 cu. ft./lb. The weight of vapor being utilized for heat exchange is substantially constant in the apparatus, that is if 100 lbs./hr. of vapor is introduced in the system this is approximately the amount of vapor utilized in the last stage. It is necessary to recognize that the tubes in the evaporators not only provide heat exchange surface but also provide conduit means for the vapor. Should the cross section of the conduit means in all the evaporators be equal, the velocity of the vapor in the later stages is increased because of the increased volume of vapor, this greater velocity increases the pressure drop as is shown in FIGURE 3. Accordingly, in the apparatus in FIGURE 7, the amount of heat exchange medium supplied in each evaporator is substantially constant; however, the volume of the conduit portions of each evaporator which is a function of the tube diameter is of an increasing nature to compensate for the increase in specific volume in the vapor. It will be appreciated that if desired other configurations of heat exchange surface may be utilized, recognizing the need for compensating conduit means wherein reasonable pressure drops should be experienced.

An example of another heat exchange tube configuration may comprise a plurality of stages, each stage having the same diameter tubes with the later stages having tubes with shorter lengths. In FIGURE 3 for conditions of constant temperature difference Δt and constant diameter tubes, the local heat transfer coefficient h, pressure drop Δp, and film velocity v increase with tube length. In FIGURE 8 there is plotted the characteristics of tubes of different diameters on a diagram plotting over-all heat transfer coefficient U vs. the product of tube length L and temperature difference Δt. From FIGURE 8 it can be seen that for a flat surface, that is, a tube having infinite diameter, the heat transfer coefficient increases slightly with tube length. However, as the tube length approaches one inch in diameter, the over-all heat transfer coefficient U rapidly increases with increases in length and Δt. In designing apparatus as shown in FIGURES 1 and 7, therefore, the heat transfer coefficient U must be reconciled to the energy requirements and equipment costs required to compensate for increased pressure drops experienced with exceedingly high heat transfer coefficients.

The present invention is directed to a method and apparatus for heat exchange and, more specifically, for distillation wherein high transfer coefficients may be realized on the evaporating surfaces by utilizing a relatively thick film which is subjected to turbulent flow except for a small sublayer which is in laminar flow to achieve a high heat transfer coefficient between the surface and the vapor being evolved from the film. This high heat transfer coefficient is due to turbulence being caused by the adjacent vapor velocity rather than by mechanical means.

While we have described preferred embodiments of our invention, it will be understood that the invention is not limited thereto since it may be otherwise embodied within the scope of the appended claims.

What we claim as new and desire to secure by Letters Patent of the United States is:

1. In a method for distillation the steps which consist in applying distilland to a stationary heat exchange surface, flowing the distilland over the heat exchange surface, placing the distilland in heat exchange relation with a medium on the opposite side of the heat exchange surface, flowing vapor over the distilland at sufficient velocity to create turbulent flow in a substantial portion of the adjacent flowing distilland whereby a sublayer of distilland having laminar flow with a thickness less than approximately one thousandth of an inch is formed between the heat exchange surface and the distilland in turbulent flow to evaporate a substantial portion of the distilland and recirculating a portion of the vapor formed from the distilland over the flowing distilland on the heat exchange surface to maintain turbulent flow therein.

2. In a method for distillation the steps which consist in applying a distilland to the evaporating surface of a first stationary heat exchanger, flowing distilland over the evaporating surface, placing the distilland in heat exchange relation with a medium at the condensing surface of the heat exchanger, flowing vapor over the distilland on the evaporating surface at a velocity to maintain turbulent flow in a substantial portion of the adjacent flowing distilland whereby a sublayer of distilland having laminar flow with a thickness less than approximately one thousandth of an inch is formed between the evaporating surface and the distilland in turbulent flow to evaporate a portion of the distilland, recirculating a portion of the vapor formed from the distilland over the flowing distilland on the evaporating surface to maintain turbulent flow therein, passing the remaining vapor evolved from the distilland adjacent the condensing surface of a second heat exchanger, condensing the distilland on the condensing surface of the second heat exchanger, applying distilland to the evaporating surface of the second heat exchanger, flowing the distilland over the evaporating surface of the second heat exchanger to place the distilland on the evaporating surface of the second heat exchanger in heat exchange relation with the vapor condensing on the condensing surface of the second heat exchanger, flowing vapor over the distilland on the evaporating surface of the second heat exchanger at sufficient velocity to maintain turbulent flow in a substantial portion of the adjacent flowing distilland whereby a sublayer of distilland having laminar flow with a thickness less than approximately one thousandth of an inch is formed between the evaporating surface of the second heat exchanger and the distilland in turbulent flow to evaporate a substantial portion of the distilland.

3. The method according to claim 2 further comprising the step of recirculating a portion of the vapor formed on the evaporating surface of the second heat exchanger over the flowing distilland on the evaporating surface of the second heat exchanger to maintain turbulent flow therein.

4. In a distillation apparatus the combination of a first stationary heat exchange wall member defining an evaporating surface opposite a heating surface, means for passing heating medium in contact with the heating surface of the wall member, means for applying and flowing distilland over the evaporating surface of the first heat exchanger to place the distilland in heat transfer relation with heat passing through heat exchange wall member, means for passing vapor in contact with and in the same direction as the flowing distilland to create turbulence in a substantial portion of the flowing distilland whereby a sublayer of distilland having laminar flow of a thickness less than approximately one thousandth of an inch is formed between the evaporating surface and the distilland in turbulent flow to evaporate a substantial portion of the distilland, a second heat exchange wall member having a condensing surface opposite an evaporating surface, means for passing and condensing vapor evolved from the distilland evaporated on the first heat exchange wall member on the condensing surface of the second heat exchange wall member, means for applying and flowing distilland over the evaporating surface of the second heat exchange wall member thereby placing the distilland in heat exchange relation with the condensing vapor on the condensing surface of the second heat exchange wall member, means for passing vapor adjacent to and in the same direction as the flowing distilland on the evaporating surface of the second heat exchange wall member to create turbulence in a substantial portion of the flowing distilland, and means associated with at least one of said evaporating surfaces for recirculating the vapor evolved therefrom to pass vapor in the same direction as distilland over the evaporating surface to maintain turbulent flow in the distilland.

5. In a distillation apparatus the combination of stationary heat exchange wall member defining a condensing surface opposite an evaporating surface, said condensing surface having parallel undulations which define outwardly projecting condensation areas spaced by inwardly projecting drainage areas, means for supplying heat exchange vapor adjacent the condensing surface whereby the vapor is condensed on the condensation area and as a result of the surface tension of the condensed vapor the liquid is drawn into the drainage areas, means for applying and flowing distilland over the evaporating surface, the distilland being in heat exchange relation with the condensing vapor on the condensing surface, means for maintaining turbulence in a substantial portion of the flowing distilland to form a sublayer of distilland having laminar flow with a thickness less than approximately one thousandth of an inch between the evaporating surface and the distilland in turbulent flow, and means for recirculating a portion of the vapor evolved from the distilland on the evaporating surface over the falling distilland in the same direction to maintain turbulent flow in said distilland.

6. In a distillation apparatus the combination of a stationary heat exchange wall member defining an evaporating surface opposite a heating surface, means for passing heating medium in contact with the heating surface of the wall member, means for applying and flowing distilland over the evaporating surface to place the distilland in heat transfer relationship with the heat passing through the heat exchange wall member, means for passing vapor in contact with and in the same direction as the flowing distilland to create turbulence in a substantial portion of the flowing distilland and to form a sublayer of distilland having laminar flow with a thickness less than approximately one-thousandth of an inch between the evaporating surface and distilland in turbulent flow to evaporate a substantial portion of the distilland, and means for recirculating a portion of the vapor evolved from the distilland on the heat exchange surface over the falling distilland in the same direction to maintain turbulent flow in said distilland.

References Cited in the file of this patent

UNITED STATES PATENTS

| | | |
|---|---|---|
| 1,425,005 | Gensecke | Aug. 8, 1922 |
| 2,069,389 | Peebles | Feb. 2, 1937 |
| 2,440,245 | Chevigny | Apr. 27, 1948 |
| 2,445,471 | Buckholdt | July 20, 1948 |
| 2,519,618 | Wilson et al. | Aug. 22, 1950 |
| 2,894,879 | Hickman | July 14, 1959 |
| 2,955,990 | Smith | Oct. 11, 1960 |